United States Patent [19]

Pombrio, Jr.

[11] Patent Number: 4,879,672

[45] Date of Patent: Nov. 7, 1989

[54] METHOD AND APPARATUS FOR TESTING RUNOUT VELOCITY AND ACCELERATION ON A SURFACE

[75] Inventor: Philip R. Pombrio, Jr., Papillion, Nebr.

[73] Assignee: Control Data Corporation, Minneapolis, Minn.

[21] Appl. No.: 87,837

[22] Filed: Aug. 21, 1987

[51] Int. Cl.[4] .......................... G01P 3/44; G01B 21/30
[52] U.S. Cl. ...................... 364/566; 364/565; 324/163; 324/162
[58] Field of Search .............. 364/566, 565, 561, 562; 324/61 R, 162, 163; 360/31, 26; 371/28; 340/347 P; 373/13

[56] References Cited

U.S. PATENT DOCUMENTS

| | | |
|---|---|---|
| 3,686,682 | 8/1972 | Behr et al. ............... 340/174.1 B |
| 3,740,736 | 6/1973 | Dion et al. ............... 340/174.1 G |
| 3,771,051 | 11/1973 | Abbe ............................ 324/61 R |
| 3,781,835 | 12/1973 | Dion et al. ........................ 340/174 |
| 3,838,447 | 10/1974 | Wray ................................ 360/26 |
| 4,064,539 | 12/1977 | Lewiner et al. ................... 358/128 |
| 4,182,981 | 1/1980 | Shum et al. ..................... 324/61 R |
| 4,183,060 | 1/1980 | Barnette et al. .................. 358/128 |
| 4,251,882 | 2/1981 | Pfefferkorn ........................ 371/28 |
| 4,300,226 | 11/1981 | Barnette, et al. .................... 369/45 |
| 4,370,724 | 1/1983 | Herbst et al. ...................... 364/561 |
| 4,549,295 | 10/1985 | Purvis ................................ 371/13 |
| 4,612,586 | 9/1986 | Sordello et al. ..................... 360/31 |
| 4,621,256 | 11/1986 | Rusk ................................. 324/163 |
| 4,622,516 | 11/1986 | Hearn et al. ...................... 324/163 |
| 4,631,524 | 12/1986 | Brooke, et al. ................ 340/347 P |
| 4,728,943 | 3/1988 | Vermeiren ..................... 324/61 R |

Primary Examiner—Parshotam S. Lall
Assistant Examiner—V. Trans
Attorney, Agent, or Firm—Joseph A. Genovese; Richard E. Billion; Robert M. Angus

[57] ABSTRACT

Disclosed is a Runout Velocity and Acceleration tester which converts an analog acceleration signal to a digital signal. The individual bits of digital data are then transformed into an exponential function. The exponential function that results is then solved for the worst case acceleration on a surface.

10 Claims, 4 Drawing Sheets

Note: LPF - Low Pass Filter

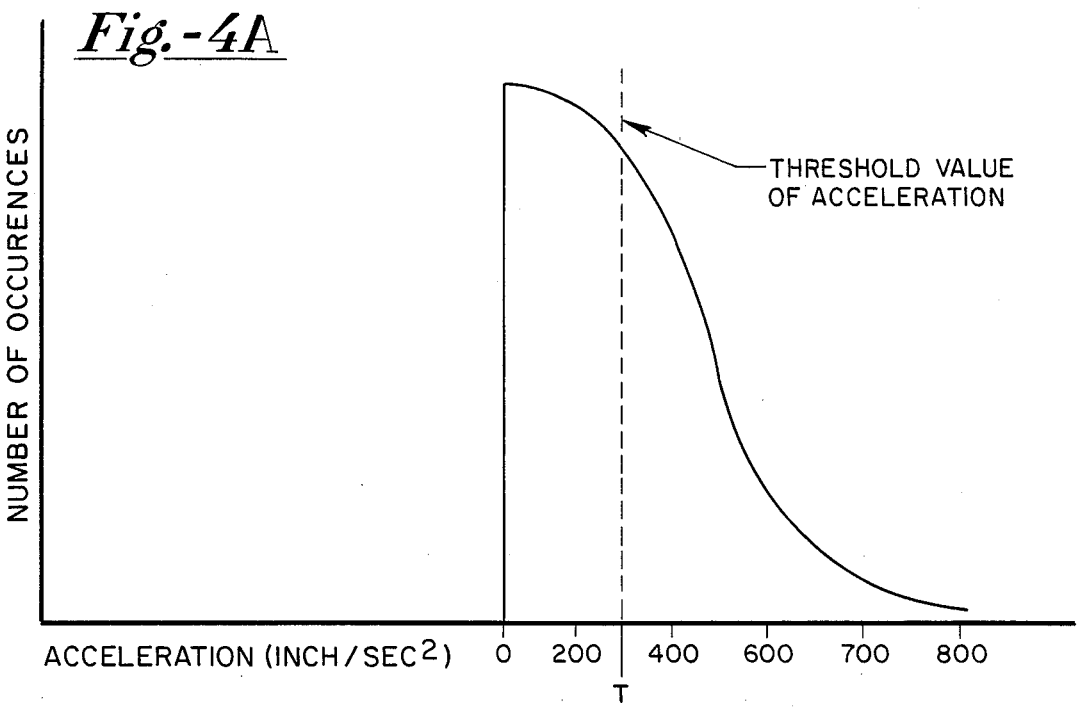
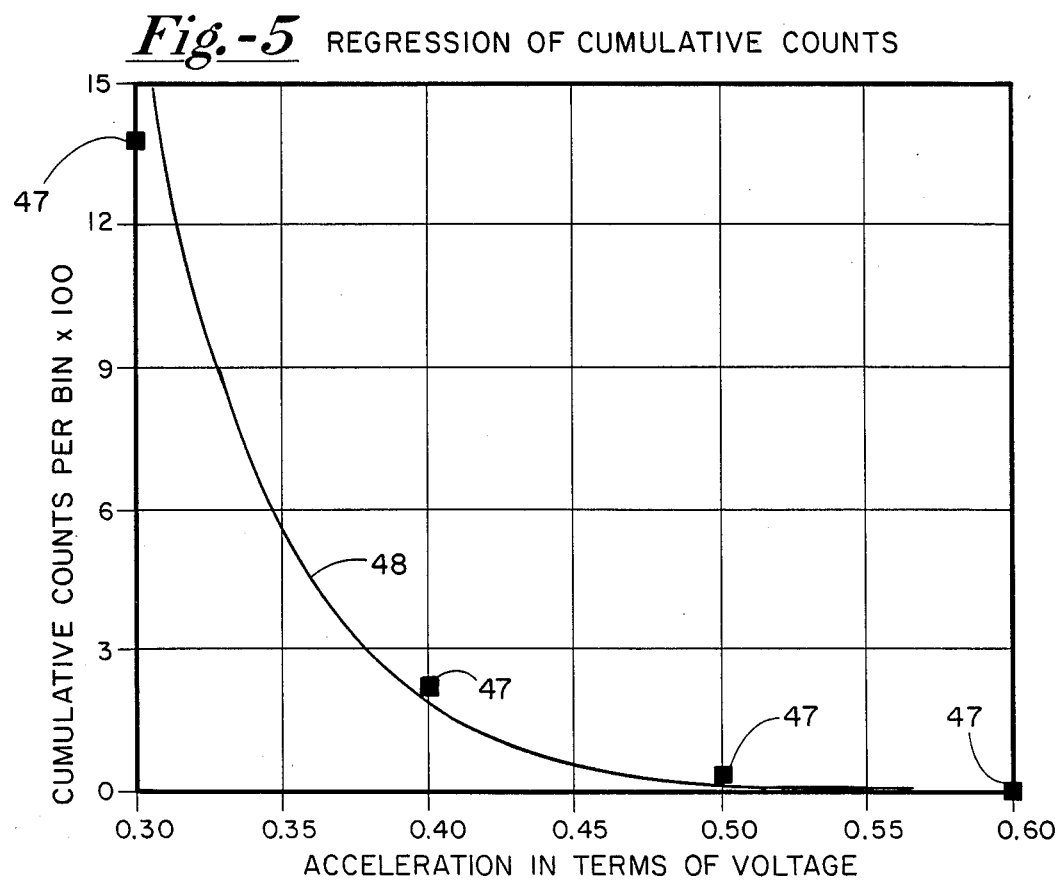

METHOD AND APPARATUS FOR TESTING RUNOUT VELOCITY AND ACCELERATION ON A SURFACE

FIELD OF THE INVENTION

The present invention relates generally to an apparatus and method for performing runout velocity and acceleration tests on a surface. More particularly, the apparatus and method are used to test disks used to store information in computer systems.

BACKGROUND OF THE INVENTION

Data storage devices used in computer systems include hard disks and heads which fly over the disk. Generally, the heads flying height is in the range of six to ten millionths of an inch above the surface of the disk. Since the head flies close to the disk at high velocity it is important that the disk is level or smooth. High points and other changes in the topography on the disk surface increase the risk of a head crash. A head crash is an unintended contact of the head with the disk which results in loss of data.

To prevent undesirable head crashes, disks are measured for smoothness with a Runout Velocity and Acceleration ("RVA") test.

Runout, as is well-known in the art, is the smoothness of the disk or the amount the displacement varies from a fixed probe to the disk as the probe travels over the disk. Runout is also known as the circumferential profile of the disk. In other words, when a probe is passed over a disk in a spiral fashion similar to a phonorecord, the distance the fixed probe is away from the disk (displacement) can be plotted against the time it takes the fixed probe to move over the spiral path. In a sense, the spiral path can be "unwound" and the plot of displacement from a fixed point with respect to time can be plotted as a continuous function.

As is well-known from physics and calculus, the first derivative of a functional relationship is the change in displacement with respect to time. This is known as velocity and gives information regarding the direction of the displacement. In addition, when the first derivative is zero it generally indicates that there is a maxima or minima occurring at that time. In this instance, a maxima or minima would correspond to a bump on the disk or a valley between bumps on the disk.

The second derivative of the function of displacement as a function of time gives further information about the maxima or minima or, in this instance, the bumps and valleys on the surface of the disk. From the second derivative it is well-known and easily found whether the point is a bump or a valley. In addition, the acceleration also gives an indication of the severity of a particular bump on a disk. The second derivative is also used to find the radius of curvature of the bump which determines the severity of the bump. Finding the second derivative of displacement with respect to time is also known as the acceleration.

The acceleration associated with a pump or valley is very important to the specific situation of a head flying over a disk. The head, ideally, flies a fixed distance off the disk. If a disk were perfectly smooth (i.e., absolutely devoid of any bumps or valleys) the head would fly a level path. However, disks are not perfect and the head must change course to maintain the fixed distance above the surface. For example, the head must dive or dip to fly into and out of a valley and must climb to fly over a hill or mountain. To enable the head to change course (i.e., climb or dive) a force must be applied to the head. A force equals mass times acceleration. Since the mass is constant, the head must be accelerated upward or downward to apply the force necessary to cause the head to climb or dive. In order for the head to stay at a constant height above a disk surface, the head must be accelerated at essentially the same acceleration as those associated with the bumps or valleys. In other words, the acceleration associated with a bump or valley on a disk must essentially be matched by the head in order for the head to fly at an essentially fixed height over a disk.

A physical limitation of the head is that it has a limited capability in acceleration. In other words, it can only change course up and down so fast.

If the acceleration associated with a bump or a valley on a disk is higher than the maximum acceleration the head is capable of, then it means one of two things. If a bump is encountered on the disk, the head will be unable to climb fast enough and the head will crash into the bump (a head crash). If a valley is encountered on the disk the head will be unable to drive fast enough and the head will skim over the valley. Data loss results since the head will fly more highly than it is supposed to. For the sake of simplicity, bumps and valleys are spoken of in terms of the acceleration associated with them.

In present Runout Velocity and Acceleration testers, capacitance probes pass over the disk at a height of about ten thousandths (0.010") of an inch. The probes and circuitry measure the second derivative of the circumferential disk profile which indicates curvatures in terms of accelerations.

Presently, two methods of RVA testing exist. A spiral method is used as a go-no/go gauge in manufacturing. The probes are moved in toward the center of a rotating disk. The analog readout of the RVA tester is fed to a comparator having a preset level therein. If the analog readout equals or exceeds the preset level the comparator signals a rejection of the disk.

A digital method tests one track of the magnetic disk at a time. A pair of probes are passed over a particular track for several revolutions. The probes measure the greatest change in height profile (acceleration) for each revolution, digitize and store the data. The digitized highest acceleration values are then averaged for the particular track to give a measure of disk quality.

Both of these methods of RVA testing have disadvantages. The digital method requires up to fifteen minutes to test a disk, which is too time-consuming for commercial production testing. Hence, the digital method is used only to test a small percentage of manufactured disks. Also, the track-to-track digital test method yields varying results when the test is repeated on the same disk.

The spiral method of RVA testing is faster and is used in manufacturing, however, the test is incomplete. The spiral method fails to provide quantifiable or verifiable data. In addition, the spiral method is not as accurate as track-to-track digital method.

Thus, there is a need for an RVA tester capable of being used in manufacturing to produce repeatable, verifiable and quantifiable data for the highest acceleration on a particular disk.

SUMMARY OF THE INVENTION

The present invention provides an apparatus and method for RVA testing capable of being used in manufacturing to repeatably produce a verifiable number for the highest acceleration on the disk.

Capacitance probes are moved toward the center while the disk is rotated to measure the rate of height change per unit of time squared ($d^2h/dt^2$). The acceleration data is digitized and since the mean value of the data is near zero, all the data points are converted to absolute value to form a "folded normal distribution." The low values of acceleration are removed. The data is then transformed into an exponential function, the ratio of the coefficients of which determine worst case acceleration.

One advantage of the invention is that the predicted worst case result is a more accurate indicator of disk quality than the result obtained using the track-to-track digital method. More accurate data is also obtained in a matter of seconds as compared to fifteen minutes with the track-to-track digital method. The technique can be accomplished in a few seconds, as compared to fifteen minutes with the track-to-track digital method. In addition, the testing technique may be used in both production and testing of disk quality.

BRIEF DESCRIPTION OF THE DRAWINGS

For a better understanding of the present invention reference may be had to the accompanying drawings, in which:

FIG. 4A is a graph of the "folded" normal distribution showing the number of counts versus the absolute value of acceleration.

FIG. 5 is a graph of the number of cumulative counts versus acceleration in terms of voltage.

These drawings are not intended as a definition of the invention but are provided solely for the purpsse of illustrating the preferred embodiment of the invention described below.

DETAILED DESCRIPTION OF THE PREFERRED EMBODIMENT

Figure 1:
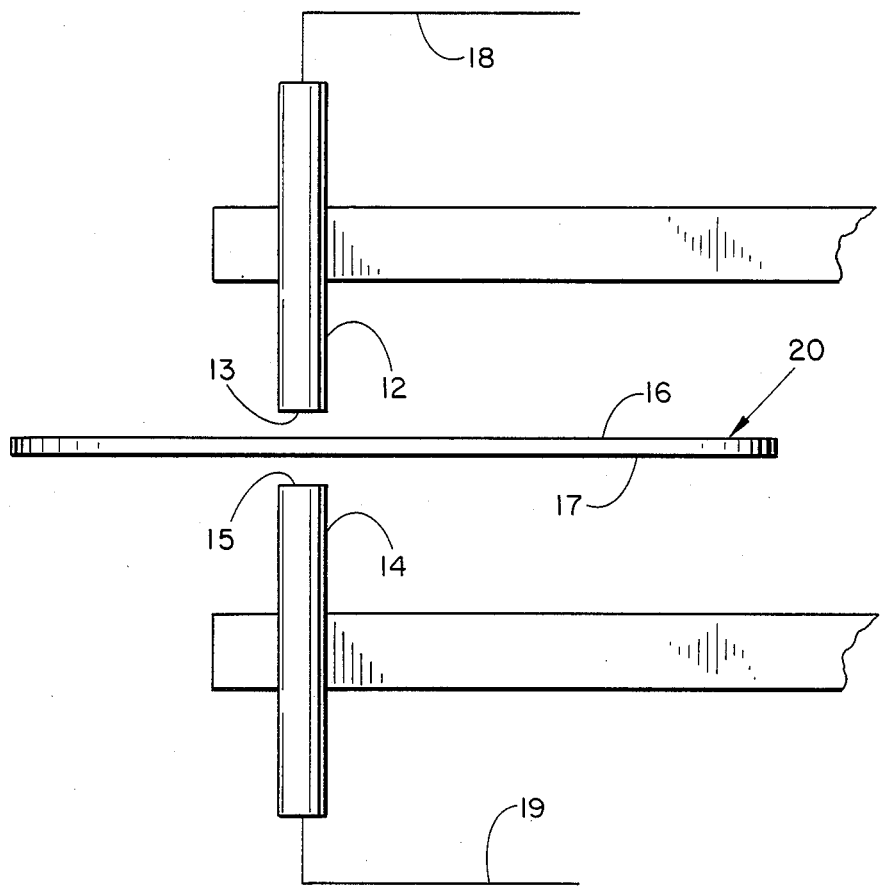
FIG. 1 is a plane view of an RVA tester for testing a disk in accordance with the preferred embodiment of the present invention.

FIG. 1 shows certain portions of the the testing apparatus 10 located near the disk comprising a first capacitance probe 12 and a second capacitance probe 14. The first capacitance probe 12 stands off from a first surface 16 of a disk 20 under test at a specified distance so that the surface on the end 13 of the probe acts as one plate of a capacitor and the surface 16 acts as a second plate of the capacitor, in a manner well-known in the art.

The second probe 14 has a surface on the end 15 which stands off a specified distance from surface 17 of disk 20 so that the surface of the end 15 acts as one plate and the surface 17 acts as the other plate of a capacitor. Probes 12 and 14 carry fixed charges. Consequently, the capacitance charge is a function of the distance between the end 13, 15 of the probe 12, 14 and the surface 16, 17 of disk 20. Changes in either distance will alter the charge on the capacitance probe 12, 14. Conductor 18 carries the signal produced by the first probe 12 and a conductor 19 carries the signal produced by the second probe 14.

FIG. 1 shows the first probe 12 and the second probe 14 positioned on opposite sides of a disk 20. It should be understood that the probes need not be positioned in the exact configuration shown. It should also be understood that the inventive device may be used to test the smoothness or flatness of any surface, not just the surface of the disk.

The changes in distance between the end 13 of the first probe 12 and the surface 16 and the changes in distance between the end 15 of the second probe 14 and the surface 17 produce outputs which reflect the changes in topography of the disk 20. Hills and valleys in the topography of the disk are detected as changes in the capacitance. The capacitance decreases as the surface of the disk moves away from the end of a probe 12, 14 and increases as the surface of the disk moves closer to the surface 12, 14. Probes 12 and 14 provide analog signals 22 and 24 on conductors 18 and 19, respectively, representative of the charge on the respective probe (see FIG. 2). Both analog signals are representative of the distance or displacement between the probes and the nearby surface.

Figure 2:
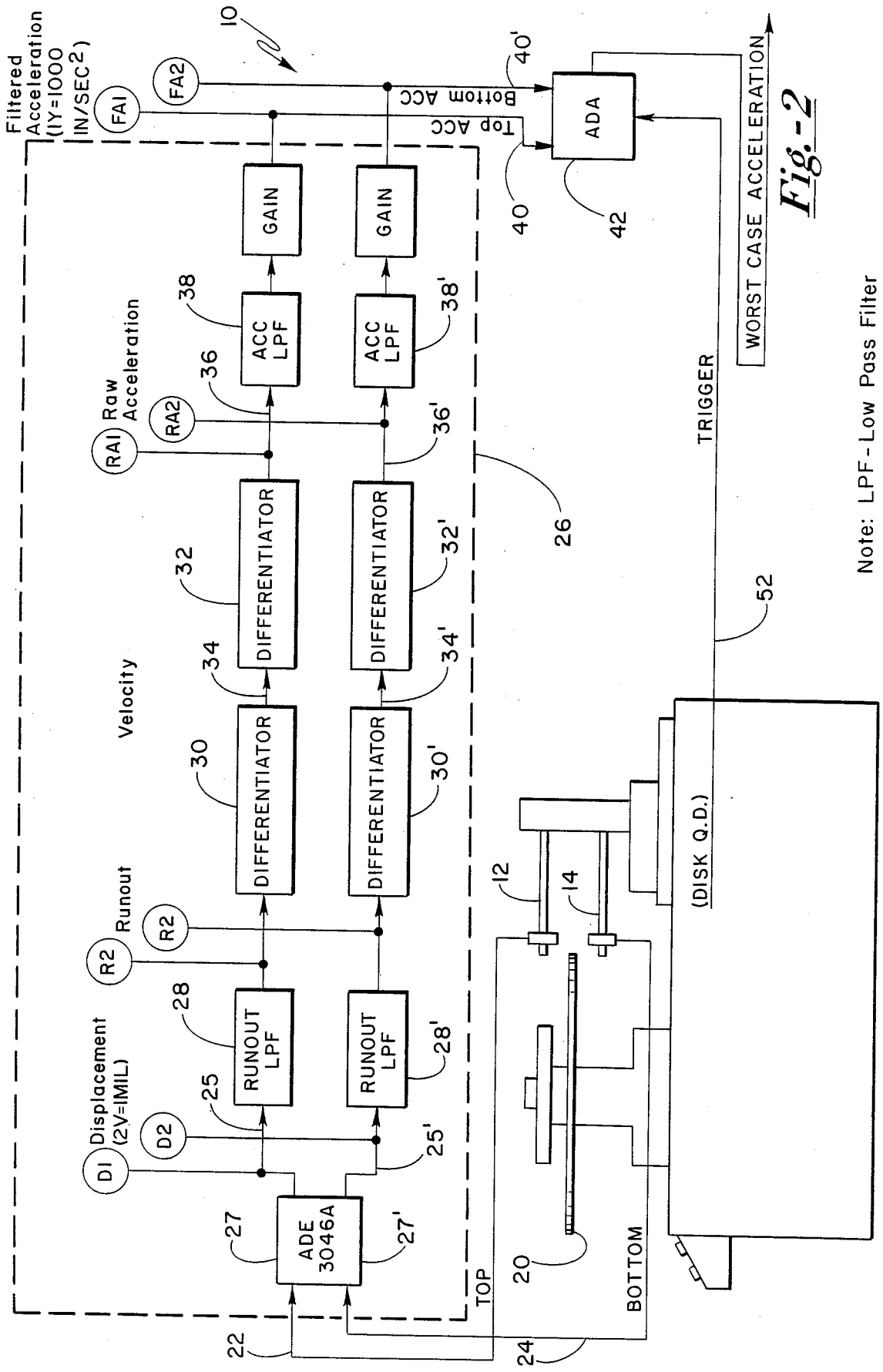
FIG. 2 show a testing apparatus together with a block diagram of the circuit.

As shown in FIG. 2, analog signals 22 and 24 are applied to detection circuitry 26, which converts the analog capacitance signals to displacement values. Each signal passes through similar circuitry, so the path for only signal 22 will be described in detail for the sake of simplification. The circuitry for signal 24 is identical and is indicated by primes. Analog signal 22 is applied to a capacitance linearizer 27, 27' which converts the change in capacitance to a signal 25, 25' which varies linearly as a function of the distance between the capacitance probe 12, 14 and the surface 16, 17. The linearized signal 25, 25' is applied through a runout low pass filter 28, 28' to remove noise. This signal is differentiated by differentiator 30, 30' to produce a velocity signal 34, 34' and by differentiator 32, 32' to produce a raw acceleration signal 36, 36'. The raw acceleration signal 36, 36' is applied through low pass filter 38, 38' and amplified to produce analog acceleration signal 40, 40'. The analog acceleration signals 40 and 40' are input to an acceleration data analyzer 42.

Figure 3:
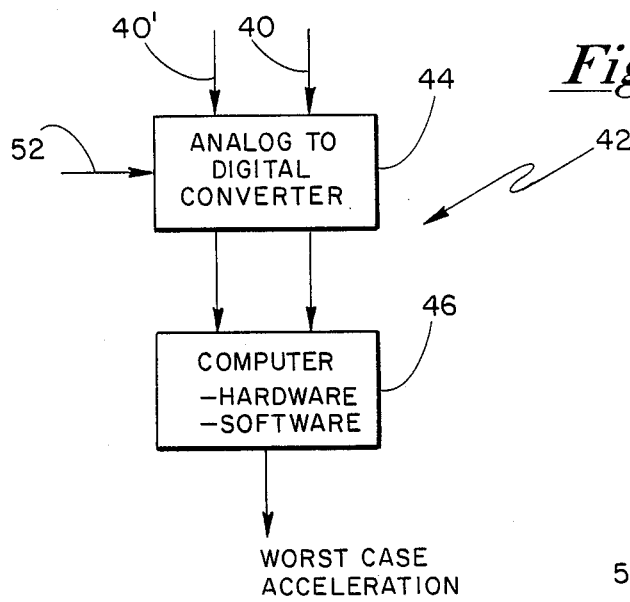
FIG. 3 is a block diagram of an acceleration data analyzer used in the circuit of FIG. 2.

As shown in FIG. 3, the acceleration data analyzer 42 comprises an analog to digital convertor 44 and a computer 46. Computer 46 is capable of storing the digitized data and is programmed to transform the data according to the flow chart shown in FIG. 4.

It should be noted that the circuitry 26 which transforms the analog displacement signals 22 and 24 into the analog acceleration signal 40 and 40' is similar to the circuitry in other spiral method RVA testers. As a result, the acceleration data analyzer 42 can be added to most conventional RVA testers, such as the model 3046A RVA tester from ADE Corporation of Watertown, Mass. which results from U.S. Pat. No. 3,771,051 issued to Abbe on Nov. 6, 1973, to form the RVA tester according to the present invention.

Figure 4:
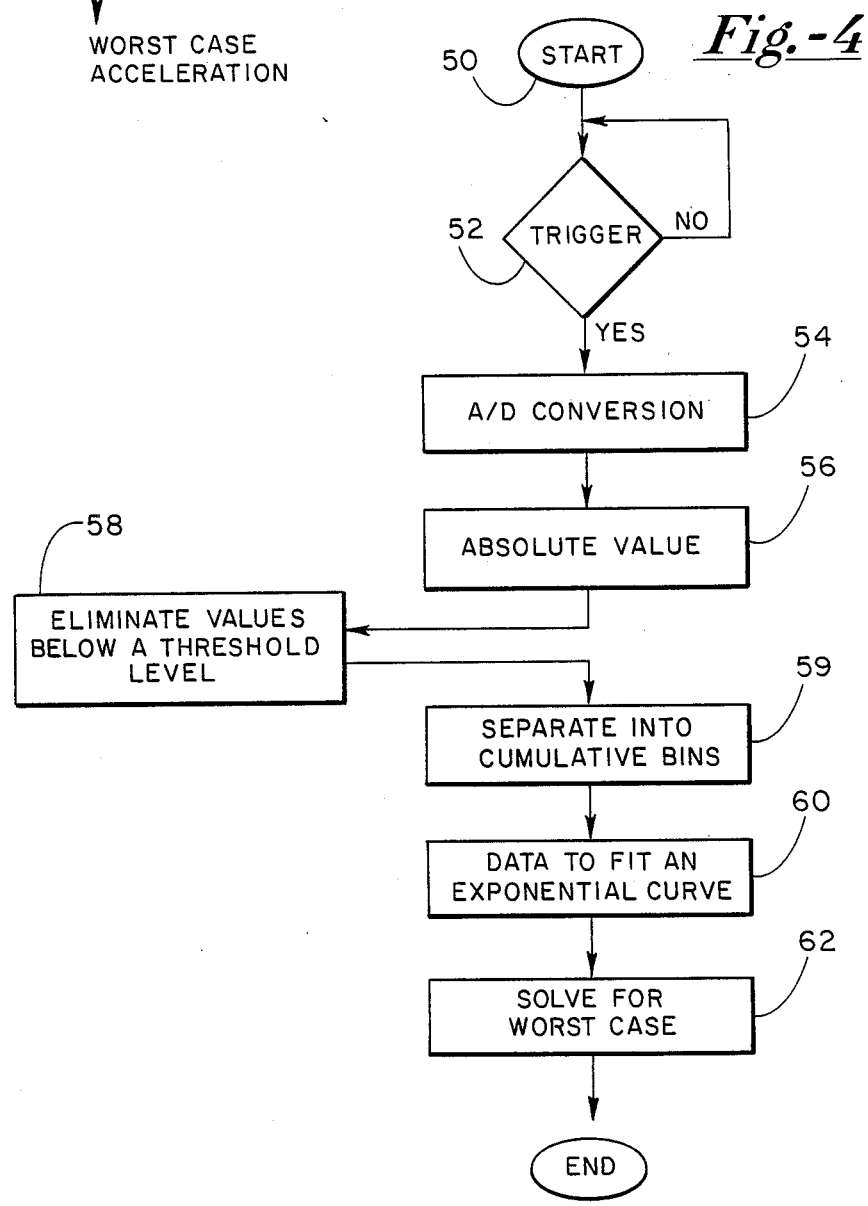
FIG. 4 is a flow diagram of the software for transforming the analog acceleration data used in the acceleration data analyzer of FIG. 2.

Turning now to FIG. 4, the method for processing the data is shown as a series of steps. As shown in FIGS. 2 and 4, a trigger signal 52 indicates when a disk is being tested. When the trigger signal 52 is absent, the process is returned to the start 50. When the trigger signal 52 is present, accleration data analyzer 42 is activated and analog acceleration data is converted to digital data by convertor 44. Computer 46 determines the absolute value of all the digitized data, at step 56, which fits a normal bell-shaped curve of distribution (FIG. 4A). The midpoint of the curve of normal distribution is near zero. Therefore, the absolute values of the digitized data form a "folded" curve of distribution. In other words, the effect of taking the absolute value is essentially the doubling of the positive data points of the normal distribution.

Acceleration data having a value less than a predetermined threshold level is eliminated at step 58. Step 58 speeds the processing of the accumulated data without degrading the accuracy or reliability of the result.

The remaing items of the digitized data are then sorted into cumulative bins or registers by computer 46 in step 59. Computer 46 establishes a predetermined number of bins, such as in separate counters or data bases, each bin having a specific acceleration value. Each item of digitized data produces a count in all of the bins which have a value less than the value of the particular item of digitized data. The result is an exponential distribution curve. To assure that the worst case acceleration is obtained and thereby to assure accuracy, the bins are set up so they exceed the expected worst case acceleration and the highest value bin(s) contain no counts.

The result is plot (FIG. 5) of the cumulative counts 47 from each bin at the various values of acceleration.

Computer 46 analyzes, at stop 60, the plot of counts 47 shown in FIG. 5 using the Least Mean Squares Curve Fitting Technique to derive the exponential curve 48, shown in FIG. 5 of the regression of cumulative counts for any particular value of acceleration. The acceleration may be in terms of voltage, such as the analog signal level from capacitor probes 12 and 14. The exponential curve is of the form $f = \alpha e^{-\beta x}$, where $f(x)$ = the number of errors at a particular level of acceleration
$\alpha$ = a first constant
$\beta$ = a second constant
$x$ = a particular level of acceleration The constants $\alpha$ and $\beta$, are determined by the Least Mean Squares Curve Fitting Technique or similar curve fitting technique, and altered by the computer until a curve with the least amount of error between the generator curve and actual data points 47 is produced.

Upon determination of the constants, $\alpha$ and $\beta$, the computer can determine the predicted worst acceleration for the particular disk being tested. Particularly, it can be shown that the expected worst case acceleration will be $$x_{max} = \frac{\ln \alpha}{\beta}$$

The $x_{max}$ output calculated by computer 46 is provided in digital form as output 43, in FIG. 3. The present invention thus provides accurate and repeatable numerical results of worst case acceleration tests for flat surfaces. The test can be accomplished in the same amount of time required to conduct an RVA test using the spiral method of RVA testing, and with greater accuracy than the digital track-to-track method. As a result, the need for the digital track-to-track technique is eliminated. Thus one RVA testing machine can be used for both production and quality testing. Furthermore, since many spiral type RVA testers already have the circuitry necessary to produce analog acceleration data they can be converted to the inventive RVA testers by adding an analog to digital convertor and an computer to handle the digital data as described above.

The present invention and the best mode for practicing it has been described. It is to be understood that the foregoing description is illustrative only and that other means and techniques can be employed without departing from the full scope of the invention described in the appended claims.

I claim:

1. A method for testing a surface for the largest acceleration associated with an irregularity on the surface from a signal representing the displacement between a fixed probe and the surface passing beneath the probe, said method comprising the steps of:
    producing a plurality of data points representative of substantially instantaneous acceleration of the displacement over time between the fixed probe, and the surface passing under the probe;
    transforming said plurality of data points into an exponential distribution curve;
    determining the largest acceleration associated with an irregularity on the surface from said exponential distribution curve; and
    comparing the determined largest acceleration associated with an irregularity on a surface to a selected level of acceleration.

2. The method of claim 1 wherein the step of transforming the data points into an exponential distribution curve further comprises the step of determining the absolute value of all the data points.

3. The method of claim 2 wherein the step of transforming the data points into an exponential distribution curve further comprises the step of eliminating all data points below a predetermined value.

4. The method of claim 2 wherein the step of transforming the data points into an exponential distribution curve further comprises:
    providing a plurality of registers each having a unique predetermined threshold value of the absolute value of the data points;
    comparing the absolute value of each data point to the threshold value of each of the plurality of registers and incrementing a count in each register whose threshold value is exceeded; and
    determining the exponential distribution curve from the threshold value of each register and the number of counts obtained in each register.

5. The method of claim 4 wherein the step of determining the exponential distribution curve includes fitting the threshold value of each register and the number of counts obtained in each register to the form $f(x) = \alpha e^{-\beta x}$ where $\alpha$ and $\beta$ are constants derived by a curve fitting technique and wherein the step of determining the largest acceleration associated with an irregularity on the surface, $x_{max}$, is determined form the reaction:

$$x_{max} = \frac{\ln \alpha}{\beta}$$

6. A method for determining the largest acceleration associated with an irregularity on a surface of a disk used in a computer memory device, said computer memory device including a head which flies at an essentially fixed altitude over the disk, said head capable of a certain maximum acceleration, said method comprising the steps of:

detecting the distance between a sensor and the surface as it is passed underneath the sensor to produce an analog signal representative of the distance between the sensor and the surface with respect to time;

twice differentiating said analog signal representative of the distance with respect to time to produce an analog signal representative of the acceleration associated with the change in distance between the disk surface and the sensor with respect to time;

digitizing the analog acceleration signal into digitized data bits each having a value of acceleration;

setting up a plurality of registers, each register having a unique threshold value of acceleration;

comparing the absolute value of acceleration of each digitized data bit with the threshold value of acceleration associated with each register;

incrementing a count in each register which has a threshold value of acceleration greater than the absolute value of acceleration for each digitized data bit;

fitting the number of counts in each register versus the threshold value of each register to a curve to produce a distribution function;

determining the largest acceleration associated with an irregularity on the surface of the disk from the distribution function; and comparing the largest acceleration associate with an irregularity on the surface of the disk with the maximum acceleration the head is capable of to determine if the head will be capable of flying at a substantially constant height over the disk.

7. The method according to claim 6 wherein the step of fitting the number of counts in each register versus the threshold value of each register to a curve includes using the Least Mean Squares Technique to fit the counts in each register versus the threshold value to a curve having a form $f(x) = \alpha e^{-\beta x}$ where $\alpha$ and $\beta$ are constants, and wherein the step of determining said largest acceleration includes using the relationship:

$$x_{max} = \frac{\ln \alpha}{\beta}$$

8. An apparatus for comparing the maximum acceleration associated with an object passed over a surface to the maximum acceleration to which the object will be subjected to maintain an essentially uniform height while passed over the surface comprising:

means for projecting a signal representing distance between a fixed probe and the surface with respect to time;

means for passing the probe over the surface;

means for twice differentiating the signal representing the distance between a fixed probe and the surface with respect to time;

an analog to digital converter for digitizing the signal representing the twice differentiated signal of the distance between a fixed probe and the surface with respect to time, to produce a plurality of digital acceleration values;

a plurality of registers each having a threshold value associated with each register;

means for comparing the absolute value of each of the plurality of digital acceleration values to the threshold value associated with each register;

means for placing a count in a register in response to the particular absolute value of digital acceleration being greater than the threshold value associated with the register so as to produce distribution data of the number of counts versus the threshold value of the registers;

means for fitting the distribution data to a curve approximating the functional relationship between the number of counts and the threshold value of the registers;

means for determining the highest absolute value of digital acceleration from the curve approximating the functional relationship between the number of counts and the unique value of the registers, said highest absolute value of digital acceleration being equal to the maximum acceleration to which the object will be subjected if the object maintains an essentially uniform height while being passed over the surface; and means for comparing the maximum acceleration associated with an object to the maximum acceleration to which the object will be subjected to determine if the object is capable of maintaining an essentially constant height while passed over the surface.

9. The apparatus of claim 8 wherein the means for fitting the distribution data to a curve further comprises means for eliminating a portion of the distribution data associated with the registers having lower threshold values and higher numbers of counts than the remaining distribution data, so that the remaining distribution data is capable of being fit to a curve having the form $f(x) = \alpha e^{-\beta x}$ where $\alpha$ and $\beta$ are constants.

10. The apparatus of claim 9 wherein the means for determining the highest absolute value of digital acceleration, $x_{max}$, includes means for determining $x_{max}$, from the relationship:

$$x_{max} = \frac{\ln \alpha}{\beta}$$

where $\alpha$ and $\beta$ are constants determined by the means for fitting the distribution data to a curve approximating the functional relationship between the number of counts and the threshold value of the register.

* * * * *

UNITED STATES PATENT AND TRADEMARK OFFICE
CERTIFICATE OF CORRECTION

PATENT NO.  :  4,879,672
DATED       :  Nov. 7, 1989
INVENTOR(S) :  Pombrio

It is certified that error appears in the above—identified patent and that said Letters Patent is hereby corrected as shown below:

Column 6, line 59 (claim 5, line 8) for "reaction" read -- relation --

Column 7, line 32 (claim 6, line 35) for "associate" read -- associated --

Column 7, line 55 (claim 8, line 6) for "projecting" read -- producing --

Signed and Sealed this

Twenty-third Day of October, 1990

Attest:

HARRY F. MANBECK, JR.

*Attesting Officer*   *Commissioner of Patents and Trademarks*